Feb. 24, 1931. B. C. ROCKWELL 1,793,637
TRUCK RACK
Filed Feb. 16, 1929 2 Sheets-Sheet 1
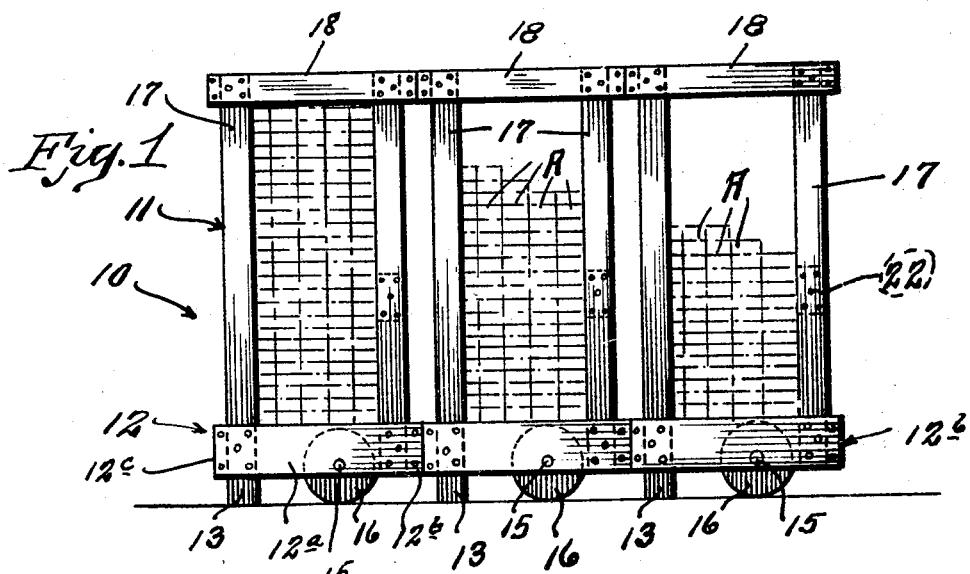
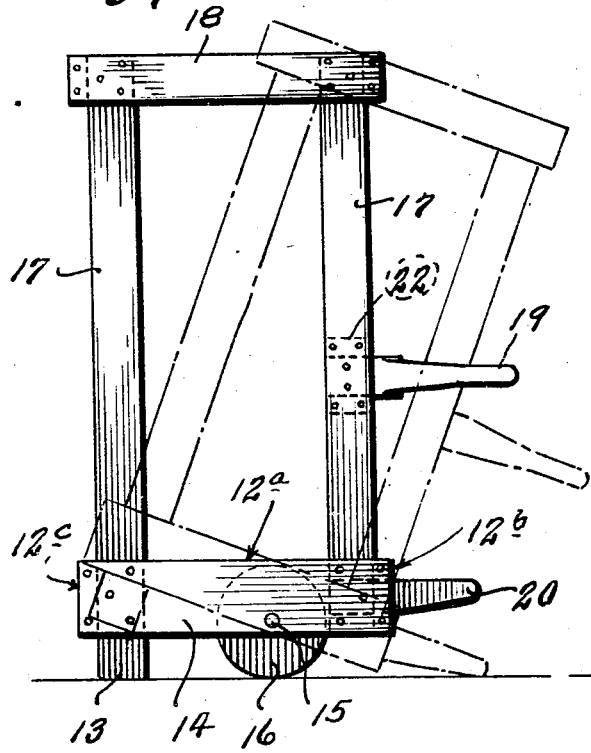
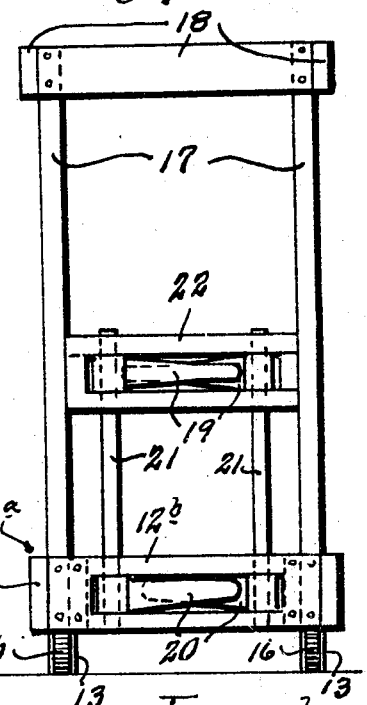
Inventor
Byrd C. Rockwell
By Cornwall & James Atty's Feb. 24, 1931.  B. C. ROCKWELL  1,793,637
TRUCK RACK
Filed Feb. 16, 1929    2 Sheets-Sheet 2
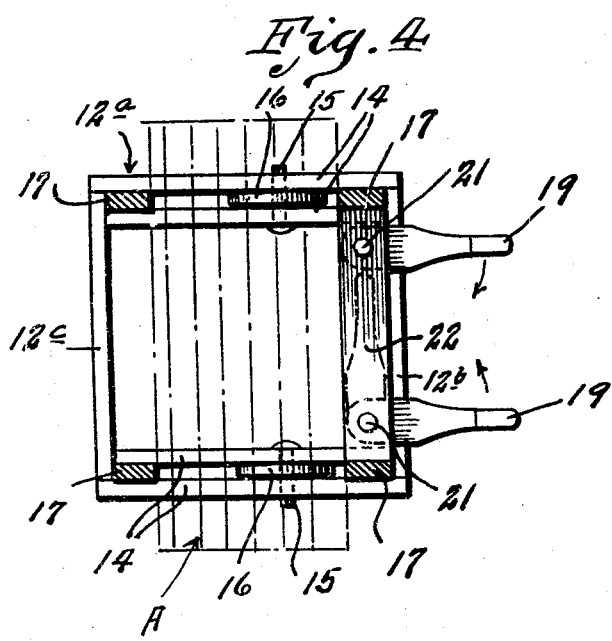
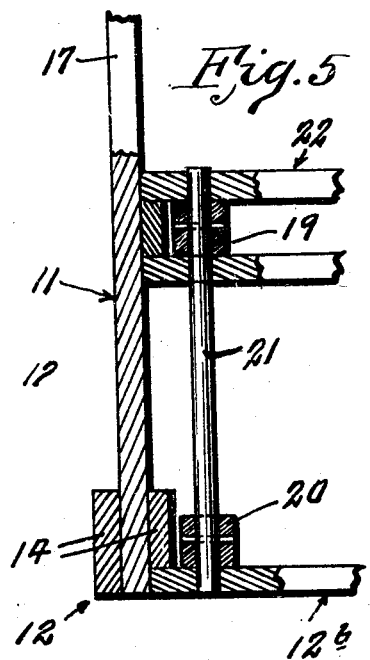
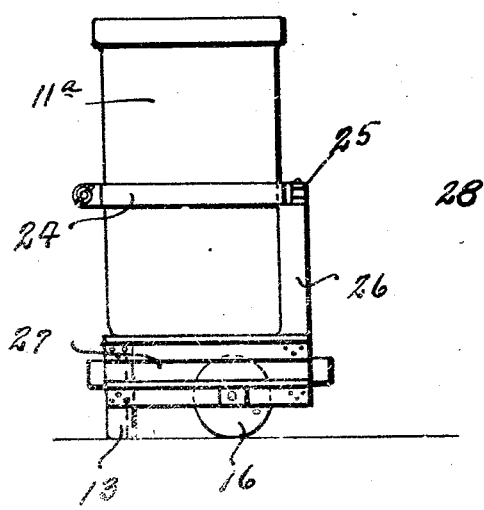
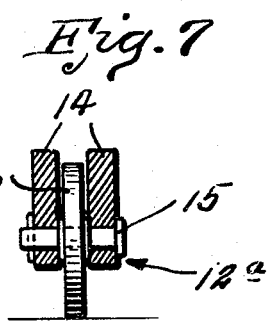
Inventor
Byrd C. Rockwell
By Cornwall & Janus
Attys.

Patented Feb. 24, 1931

1,793,637

UNITED STATES PATENT OFFICE

BYRD C. ROCKWELL, OF CAMDEN, ARKANSAS

TRUCK RACK

Application filed February 16, 1929. Serial No. 340,495.

This invention relates to new and useful improvements in factory truck racks, the chief objects of the invention being the provision of a rack or material container having a wheeled support so that it may be readily moved about from place to place and which is so constructed that it occupies very little floor space.

Other objects of the invention are to provide a combined truck and rack so arranged that when it is used for storage purposes there are no projections on the device, thereby enabling a member of truck racks to be placed closely against each other.

Further objects of the invention are to provide a truck having its wheels mounted in the side members of the truck and near one end thereof, the opposite end being provided with a pair of spaced legs which when the truck is in transit are raised above the floor by tilting the truck on the wheels and which when the truck occupies a stationary position cooperate with said wheels to form a firm support for said truck.

Still further objects of the invention are to provide handles for the truck by means of which said truck can be tilted and moved about, said handles being so mounted that they may be retracted or folded against the side of the truck so as to leave said side free of all projections.

Additional objects of the invention are to provide suitable bumpers or stops adapted to be projected from the truck outwardly, preferably in correlation with the positioning of the handles, said stops being arranged in spaced relation with the floor and to one side of the wheels of the truck so as to provide stops for limiting the tilting movement of the truck, thereby preventing overturning of the truck and the rack carried thereby.

With these and other objects in view, my invention consists in certain novel features of construction and arrangement of parts, hereinafter more fully described and claimed, and illustrated in the accompanying drawings, in which—

Figure 1 is a view showing a plurality of my improved truck racks arranged in a row for storage purposes.
Figure 2 is an enlarged side elevational view of the truck rack with the handles and bumpers in extended positions and showing in dotted lines the truck in tilted position.

Figure 3 is an end elevational view of the truck rack showing the handles and bumpers thereof in folded or retracted positions.

Figure 4 is an enlarged horizontal cross section taken above the handles of said truck rack.

Figure 5 is an enlarged vertical cross section showing the pivotal mounting for the handle and the bumper of said truck rack.

Figure 6 is a modified form of my invention.

Figure 7 is an enlarged vertical cross section showing the mounting of the wheel between the side members of the truck frame.

My present invention contemplates the provision of a truck or wheeled rack or container suitable for storing a large number of objects, the major axis of the container being disposed in a vertical plane so as to conserve the floor space and at the same time provide a container or rack of large capacity. The particular arrangement of the wheeled support facilitates the movement of the rack and the material carried thereby and provides a firm footing when the rack or container rests squarely on the floor.

My improved truck rack is of simple construction so that the cost thereof is not appreciably greater than the cost of an ordinary rack and consequently permitting the use of a large number of said truck racks without increasing the cost of factory equipment.

Referring by numerals to the accompanying drawings, 10 indicates a truck rack having a rack or container portion 11 and a wheeled support or truck portion 12. The truck portion 12 comprises sides 12$^a$, a rear end 12$^b$, and a front end 12$^c$. The front end has fixed thereto a pair of vertically disposed depending legs 13. Each side 12$^a$ consists of a pair of spaced longitudinal members 14 and legs 13 are preferably used as spacers for the front ends thereof, being arranged therebetween and secured thereto.

A pin 15 extends transversely between each pair of members 14 near the rear ends thereof and carries a wheel 16 which is mounted thereon and is freely disposed between members 14. Thus the legs 13 form a fixed support for the front end of the truck and wheels 16 form a wheeled support for the rear end of the truck; and both the legs and the wheels are located inside of the truck leaving the outside thereof free of projections so that a number of truck racks can be placed closely together thereby preventing wastage of floor space. The lowermost portions of legs 13 and wheels 16 are located on the same horizontal plane whereby when the truck occupies a stationary position said legs and wheels support the truck in normal horizontal position. Preferably legs 13 are arranged between side members 14 and on the inside of the end member 12ᶜ.

In the instant case, the rack portion 11 is designed for use in woodworking factories and contains a plurality of sections of lumber stacked thereon transversely of the truck.

Therefore, the rack portion consists of four uprights or corner posts 17 which are preferably secured to the truck and extend upwardly therefrom for a suitable distance. The upper ends of these uprights are secured together by cross members 18. The material, such as pieces of lumber or flooring A, are stacked on the truck, transversely thereof and are held in position by the corner posts 17. When it is desired to move the material, the truck 12 and the rack 11 carried thereby are tilted from vertical about the axis of wheels 16 so as to raise the legs 13 off the floor, whereupon the device can then be wheeled to the desired place on said wheels 16. In order to facilitate the tilting of the truck rack and the manipulation thereof on wheels 16, a pair of handles 19 is arranged at one end of the truck in opposed relation to legs 13.

To prevent overbalancing of the truck rack when in tilted position, which when loaded might cause injury to the workmen, a pair of bumpers or stops 20 is provided in the rear end 12ᵇ of the truck and these bumpers form stops and limit the tilting movement of the truck rack. Both handles 19 and bumpers 20 are so arranged that when the truck rack occupies a stationary position, said handles and said bumpers can be retracted or folded so as to position them inwardly of the outside plane of the rear member 12ᵇ so that said handles and bumpers cannot interfere with storing of the truck racks in juxtaposed relation.

As disclosed in the accompanying drawings, handles 19 and bumpers 20 are so mounted that they can be moved in a horizontal plane into either extended operative positions or inwardly against the side of the truck rack into retracted positions. Furthermore, they are correlated with each other so that the movement of one of the handles into operative extended position automatically projects the corresponding bumper into operative position, thereby assuring the safety of the workmen. This automatic operation of the bumper is accomplished by the use of a vertically disposed rod 21, the lower end of which is revolubly mounted in the rear end 12ᵇ near the corresponding corner post 17 while the upper end of each rod is revolubly mounted in a cross piece 22 which is secured to and extends between the pair of rear corner posts 17. One end of each handle 19 is secured to the corresponding rod 21 near the upper end thereof and one end of bumper 20 is secured to the corresponding rod 21 near the lower end thereof, so that the pivotal movement of one of the handles 19 actuates rod 21 and causes simultaneous corresponding movement of the respective bumper 20.

The cross member 22 is formed with a horizontally disposed slot 22ᵃ and the handles 19 are mounted within this slot whereby the upper and lower faces of the inner ends of said handles have bearing contacts with the faces of said slot so that the strain to which the handles are subjected when tilting the truck rack are transmitted to said cross piece. Furthermore, said slot forms a pocket into which the handles can be retracted.

The rear end piece 12ᵇ is similarly formed with a horizontally disposed slot 12ᶜ and the bumpers 20 have their inner ends extending through this slot and have bearing contact therewith. This slot also forms a pocket for receiving the bumpers when the latter occupy folded positions.

My improved truck rack is primarily intended for use in woodworking establishments and accordingly is constructed from material on hand, all of the parts, with the possible exception of the pins 15, being of wood. This insures low cost of construction as the material can be had for very little cost and no skilled labor is required. The front corner posts 17 extend below truck 11 and the lower ends of said posts serve as legs 13. However, both the truck 12 and rack 11 can be constructed of metal and the latter can be formed separate from the truck and attached thereto as shown in the modified form in Figure 6.

In this case the container 11ᵃ is held on the truck by a separable strap 24 which is hingedly mounted at 25 to extension 26 of truck 27. This extension 26 also carries the handles 22.

As my improved truck racks are inexpensive to manufacture, a large number of them can be used and utilized for storage purposes. This eliminates loading and unloading the trucks and assures quick movement of the material through the factory.

It is obvious that my truck rack is susceptible of various changes and modifications without departing from the spirit of my invention.

I claim:

1. A truck rack comprising in combination a truck frame, consisting of end members and side members, each side member comprising a pair of spaced longitudinally disposed members provided near one end with a depending leg and near the other end with a wheel, corner posts secured to said truck frame and extending upwardly therefrom, said truck rack being tiltable on said wheels to raise said legs from the floor, and stops mounted in the rear end member for pivotal movement in a horizontal plane in spaced relation with said wheels, said stops being extensible longitudinally in a direction opposite to said legs for limiting the tilting movement of said truck rack.

2. A truck rack comprising a truck provided at its front end with depending legs and near the rear end with a pair of wheels, a material container carried by and extending upwardly from said truck, said legs and wheels being disposed within the planes of the vertical sides of said container, a pair of handles carried by the rear end of said truck and movable into longitudinal extended positions for tilting said truck and container on said wheels, said handles being retractable inwardly beyond the plane of the vertical end of said container, and stops mounted on the rear end of said truck and operable in conjunction with said handles into projected positions to limit the tilting movement of said truck rack and into retracted positions to leave the rear end of said truck and container free of all projections.

3. In a device of the class described, a truck provided at its front end with a pair of legs and near the rear end with a pair of wheels for supporting said truck, the latter being tiltable on said wheels to raise said feet from the ground, a pair of bumpers operatively carried by the rear end of said truck and movable in a horizontal plane into projecting position to form stops for limiting the tilting movement of said truck, said bumpers being movable into retracted positions to leave the rear end free of all projections, and a pair of handles arranged in spaced vertical relation with said bumpers for manipulating said truck and positioning said bumpers.

4. In a device of the class described, a truck provided at its front end with a pair of legs and near the rear end with a pair of wheels for supporting said truck, the latter being tiltable on said wheels to raise said feet from the ground, a pair of bumpers operatively carried by the rear end of said truck and movable into projecting position to form stops for limiting the tilting movement of said truck, said bumpers being movable into retracted positions to leave the rear end free of all projections, and a pair of handles arranged in spaced vertical relation with said bumpers for manipulating said truck, said handles and said bumpers being simultaneously operable into operative projected positions and into inoperative retracted positions.

5. In a device of the class described, the combination of a truck portion provided near the rear end with a pair of wheels and at its front end with a pair of legs, said truck being tiltable rearwardly on said wheels to raise said legs off the ground, a pair of bumpers pivotally mounted on the rear end of said truck and operable into rearwardly projected positions to form stops for limiting the tilting movement of said truck, said bumpers being retractable past the plane of the rear end of said truck, and a pair of handles pivotally mounted above said bumpers and operable conjointly therewith into projected operative positions and into retracted inoperative positions, whereby when said handles and bumpers occupy retracted positions the rear end of said device is free of all projections.

6. In a device of the class described, the combination of a truck portion provided near the rear end with a pair of wheels and at its front end with a pair of legs, said truck being tiltable rearwardly on said wheels to raise said legs off the ground, a pair of bumpers pivotally mounted on the rear end of said truck and operable into rearwardly projected positions to form stops for limiting the tilting movement of said truck, said bumpers being retractable past the plane of the rear end of said truck, a pair of handles pivotally mounted above said bumpers and operable conjointly with said bumpers into projected operative positions and into retracted inoperative positions, and a material receiving member attached to said truck and projecting upwardly therefrom.

7. A truck rack of the class described comprising in combination a rack having its major axis disposed in a vertical plane, a pair of fixed legs arranged near one end of the base of said rack, a pair of wheels operatively mounted near the other end of said base whereby said rack is tiltable on said wheels to raise said legs from the ground, a pair of arms pivotally mounted on vertically disposed pivots and extensible longitudinally from said other end of said base to form stops for limiting the tilting movement of said rack, and a pair of handles mounted above and conjointly with said arms, said handles being projectable rearwardly from said rack for actuating said arms and manipulating said rack on said wheels.

8. A truck rack of the class described comprising a base, a rack portion extending upwardly therefrom, a pair of fixed legs depending from one end of said base, a pair of wheels operatively mounted near the other end of said base whereby said rack can be tilted from vertical position to raise said legs from the ground, a pair of vertically disposed spaced rods arranged in the rear end of said rack, a pair of arms carried by the lower ends of said rods, and a pair of handles carried by the upper ends of said rods, said handles and said arms being movable in a horizontal plane into extended position whereby said arms form stops for limiting the tilting movement of said rack, and said handles provide means for manipulating said rack.

9. In a truck rack of the class described, a base comprising side members, each of which consists of a pair of longitudinal spaced-apart members and front and rear transverse members uniting said longitudinal members, a pair of stationary legs arranged adjacent to the front transverse member, a pair of wheels each of which is mounted between the corresponding spaced-apart longitudinal members, said legs and said wheels being arranged inwardly of the outside vertical planes of said base, and a pair of arms pivotally mounted on said rear transverse members and operable into extensible positions rearwardly of said transverse rear member to provide stops for limiting the tilting movement of said truck rack, said arms being foldable inwardly beyond the vertical plane of the outside face of said rear transverse member.

10. In a truck rack of the class described, a base comprising side members each of which consists of a pair of longitudinal spaced-apart members and front and rear transverse members uniting said longitudinal members, a pair of stationary legs arranged adjacent to the front transverse member, a pair of wheels, each of which is mounted between the corresponding spaced-apart longitudinal members, said legs and said wheels being arranged inwardly of the outside vertical planes of said base, a pair of arms pivotally mounted on said rear transverse member and operable into extensible positions rearwardly of said transverse rear member to provide stops for limiting the tilting movement of said truck rack, said arms being foldable inwardly beyond the vertical plane of the outside face of said rear transverse member, and a pair of handles cooperatively arranged with said arms and operable for actuating said arms simultaneously with the positioning of said handles.

In testimony whereof I hereunto affix my signature this 12th day of February, 1929.

BYRD C. ROCKWELL.